(12) United States Patent
Oka et al.

(10) Patent No.: US 9,013,646 B2
(45) Date of Patent: Apr. 21, 2015

(54) LIQUID CRYSTAL DISPLAY INCLUDING PARALLAX BARRIER LIQUID CRYSTAL DISPLAY PANEL

(75) Inventors: Shinichiro Oka, Hitachi (JP); Shinichi Komura, Mobara (JP)

(73) Assignee: Japan Display Inc., Tokyo (JP)

( * ) Notice: Subject to any disclaimer, the term of this patent is extended or adjusted under 35 U.S.C. 154(b) by 579 days.

(21) Appl. No.: 13/280,400

(22) Filed: Oct. 25, 2011

(65) Prior Publication Data

US 2012/0105771 A1    May 3, 2012

(30) Foreign Application Priority Data

Oct. 29, 2010    (JP) .................................. 2010-243581

(51) Int. Cl.
  *G02F 1/1335*    (2006.01)
  *G02F 1/1347*    (2006.01)
  *H04N 13/04*    (2006.01)

(52) U.S. Cl.
  CPC ...... *G02F 1/133536* (2013.01); *H04N 13/0413* (2013.01); *G02F 1/13471* (2013.01)

(58) Field of Classification Search
  CPC ...................... G02B 27/2278; G02F 1/133536
  USPC ...................... 349/15, 65, 74–77, 83, 96, 113
  See application file for complete search history.

(56) References Cited

U.S. PATENT DOCUMENTS

| | | | |
|---|---|---|---|
| 6,046,849 A | 4/2000 | Moseley et al. | |
| 7,079,174 B2 | 7/2006 | Taniguchi et al. | |
| 7,199,845 B2 | 4/2007 | Koyama et al. | |
| 7,268,747 B2 | 9/2007 | Taniguchi et al. | |
| 8,023,052 B1 * | 9/2011 | Osterman et al. | 349/15 |

(Continued)

FOREIGN PATENT DOCUMENTS

| | | |
|---|---|---|
| CN | 101080661 | 9/2008 |
| CN | 101271199 | 9/2008 |

(Continued)

OTHER PUBLICATIONS

"Enhanced polarizer with optically diffusing layer", Research Disclosure, Mason Publications, Hampshire, GB, vol. 431, No. 54, Mar. 1, 2000; ISSN: 0374-4353 paragraph [0001].

(Continued)

*Primary Examiner* — Bumsuk Won
*Assistant Examiner* — Paisley L Arendt
(74) *Attorney, Agent, or Firm* — Antonelli, Terry, Stout & Kraus, LLP.

(57) ABSTRACT

A display device includes: a first liquid crystal display panel which performs an image display; a second liquid crystal display panel which is arranged on a back surface side of the first liquid crystal display panel and performs a display of a parallax barrier pattern; a backlight unit which is arranged on a back surface side of the second liquid crystal display panel; and a first polarization reflector which is arranged between the first liquid crystal display panel and the second liquid crystal display panel, and allows the transmission of light having a polarization component, which has one polarization direction, of lights having two polarization components orthogonal to each other and reflects the light having a polarization component orthogonal to the polarization direction, wherein the first polarization reflector reflects the backlight light corresponding to the light blocking regions to the second liquid crystal display panel.

4 Claims, 8 Drawing Sheets

(56) References Cited

U.S. PATENT DOCUMENTS

| | | |
|---|---|---|
| 2006/0082698 A1 | 4/2006 | Ko et al. |
| 2007/0013624 A1 | 1/2007 | Bourhill |
| 2008/0231952 A1 | 9/2008 | Kim |

FOREIGN PATENT DOCUMENTS

| | | |
|---|---|---|
| JP | 08-076139 | 3/1996 |
| JP | 10-123461 | 5/1998 |
| JP | 2004-120058 | 4/2004 |
| JP | 2004-302409 | 10/2004 |
| JP | 2007-25683 | 2/2007 |
| JP | 2007-199366 | 8/2007 |
| KR | 10-2006-0076609 | 7/2006 |
| KR | 20060076609 * | 7/2006 |
| WO | WO 2006/046168 | 5/2006 |

OTHER PUBLICATIONS

Translation of corresponding Office Action for Chinese Patent Application No. 201110339483.4.
Partial Translation of Office Action for Taiwanese Patent Application No. 100138724 dated Feb. 27, 2014.

* cited by examiner

LIQUID CRYSTAL DISPLAY INCLUDING PARALLAX BARRIER LIQUID CRYSTAL DISPLAY PANEL

CROSS-REFERENCE TO RELATED APPLICATION

The present application claims priority from Japanese application JP2010-243581 filed on Oct. 29, 2010, the content of which is hereby incorporated by reference into this application.

BACKGROUND OF THE INVENTION

1. Field of the Invention

The present invention relates to a liquid crystal display device, and more particularly to a liquid crystal display device which includes a parallax barrier which enables a viewer to observe different images at plural viewpoints.

2. Description of the Related Art

A conventional liquid crystal display device which has a parallax barrier and can switch a display mode between a two-dimensional display (2D display) and a three-dimensional display (3D display) is constituted of: as shown in FIG. 11 and FIG. 12, a first liquid crystal display panel LCD1 which is a liquid crystal display panel for image display; a second liquid crystal display panel LCD2 which is a liquid crystal display panel for a parallax barrier for displaying a stripe pattern which functions as the parallax barrier; and a backlight unit BLU which irradiates a backlight light. The conventional liquid crystal display device having such a constitution is classified into a type (see FIG. 11) where the first liquid crystal display panel LCD1 is arranged between the second liquid crystal display panel LCD2 and the backlight unit BLU and a type (see FIG. 12) where the second liquid crystal display panel LCD2 is arranged between the first liquid crystal display panel LCD1 and the backlight unit BLU. The liquid crystal display device having such a constitution is disclosed in JP 10-123461 A, for example.

SUMMARY OF THE INVENTION

The detailed constitution of the liquid crystal display device of the type, which is one of the liquid crystal display devices having such constitutions, where the second liquid crystal display panel LCD2 is arranged between the first liquid crystal display panel LCD1 and the backlight unit BLU is shown in FIG. 13. In the liquid crystal display device shown in FIG. 13, in the order starting from a backlight unit BLU side, a polarization reflector hereinafter referred to as an SP wave reflector BEM, a polarizer POL2, the second liquid crystal display panel LCD2, a polarizer POL1, the first liquid crystal display panel LCD1 and a polarizer POL3 are arranged in an overlapping manner. In performing a 3D display with such a liquid crystal display device, a black stripe is displayed on the second liquid crystal display panel LCD2, wherein the stripe functions as a parallax barrier, and an image corresponding to the 3D display is displayed on the first liquid crystal display panel LCD1. Here, in the conventional liquid crystal display device, the backlight light which is irradiated from the backlight unit BLU, passes through the SP wave reflector BEM and the polarizer POL2 and is incident on the second liquid crystal display panel LCD2. And then, the backlight light corresponding to the black stripe portions forming the parallax barrier is absorbed by the polarizer POL1. For example, when light blocking regions (black stripe portions) and light transmission regions (portions which allow the transmission of the backlight light) in the parallax barrier are designed on a 1 to 1 basis, half of the backlight light of the backlight light incident on the second liquid crystal display panel LCD2 is absorbed by the polarizer POL1. As a result, there arises a drawback that display brightness when performing the 3D display is largely lowered, and there has been a strong demand for a method of overcoming such a drawback.

The present invention has been made in view of these drawbacks, and it is an object of the present invention to provide a technique which can enhance brightness when performing 3-dimensional display in a liquid crystal display device of a type where a two-dimensional display and a three-dimensional display are switched by forming a parallax barrier in one liquid crystal display panel of two liquid crystal display panels.

To overcome the above-mentioned drawbacks, according to one aspect of the present invention, there is provided a liquid crystal display device which includes: a first liquid crystal display panel which performs an image display; a second liquid crystal display panel which is arranged on a back surface side of the first liquid crystal display panel and performs a display of a parallax barrier pattern constituted of light transmission regions and light blocking regions; and a backlight unit which is arranged on a back surface side of the second liquid crystal display panel and irradiates a backlight light, the backlight light being irradiated to the first liquid crystal display panel via the second liquid crystal display panel, wherein the liquid crystal display device further includes a first SP wave reflector which allows the transmission of light, which has a polarization component having the same polarization direction of the first SP wave reflector, of lights having two polarization components orthogonal to each other and reflects the light having polarization component which does not have the same polarization direction, the first SP wave reflector is arranged between the first liquid crystal display panel and the second liquid crystal display panel, and the backlight light, which passes through the second liquid crystal display panel, corresponding to the light blocking regions is reflected to the second liquid crystal display panel.

According to the present invention, in the liquid crystal display device of a type where the parallax barrier is formed on one liquid crystal display panel of two liquid crystal display panels thus switching a display between the two-dimensional display and a three-dimensional display, brightness of an image when performing three-dimensional display can be enhanced.

Other advantageous effects of the present invention will become apparent from the description of the whole specification.

DETAILED DESCRIPTION OF THE INVENTION

Hereinafter, an embodiment to which the present invention is applied is explained in conjunction with drawings. In the explanation made hereinafter, however, identical constitutional elements are given the same symbols and the repeated explanation of these parts is omitted.

Embodiment 1

Figure 1:
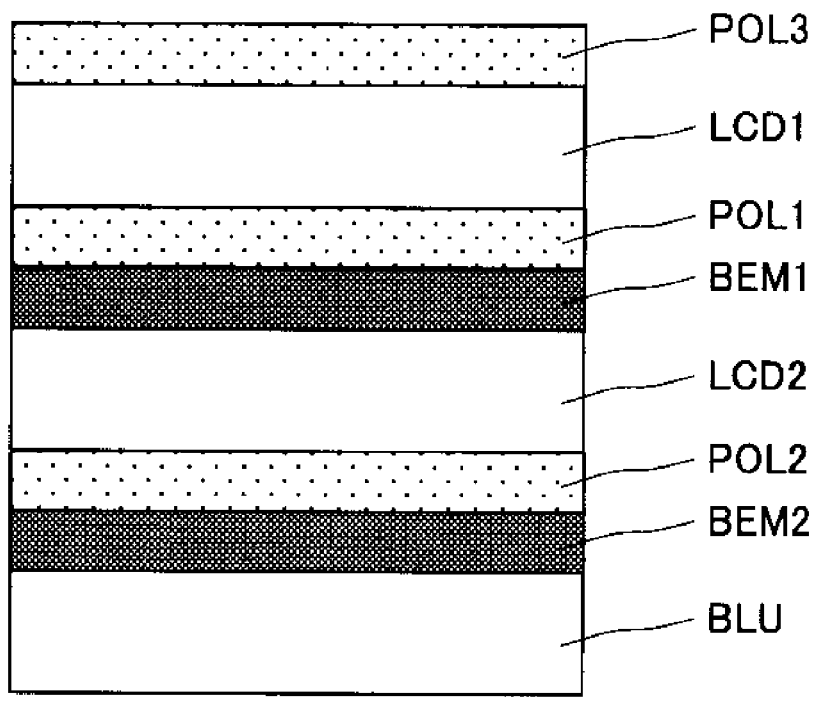
FIG. 1 is a cross-sectional view for explaining the schematic constitution of a liquid crystal display device according to an embodiment 1 of the present invention.

FIG. 1 is a cross-sectional view for explaining the schematic constitution of a liquid crystal display device according to the embodiment 1 of the present invention. Hereinafter, the overall constitution of the liquid crystal display device of the embodiment 1 is explained in conjunction with FIG. 1. In the explanation made hereinafter, however, except for a polarizer POL and an SP wave reflector BEM, the explanation of well-known optical sheets such as a prism sheet and a diffusion plate is omitted.

The liquid crystal display device of the embodiment 1 includes: a first liquid crystal display panel LCD1 which is a liquid crystal display panel for image display: and a second liquid crystal display panel LCD2 which is a liquid crystal display panel for a parallax barrier which displays a stripe pattern functioning as the parallax barrier. Particularly, the second liquid crystal display panel LCD2 is arranged between a backlight unit BLU and the first liquid crystal display panel LCD1. In the liquid crystal display device of the embodiment 1 having such a constitution, as shown in FIG. 1, a second SP wave reflector BEM2, a second polarizer POL2, the second liquid crystal display panel LCD2, a first SP wave reflector BEM1, a first polarizer POL1, the first liquid crystal display panel LCD1, and a third polarizer POL3 are arranged in an overlapping manner in this order respectively starting from the backlight unit BLU side.

The second liquid crystal display panel LCD2 according to the embodiment 1 is formed of a twisted-nematic-type (hereinafter, referred to as TN-type) liquid crystal display panel. The first polarizer POL1 and the second polarizer POL2 are arranged so as to sandwich the second liquid crystal display panel LCD2 therebetween, wherein a polarization axis of the first polarizer POL1 and a polarization axis of the second polarizer POL2 are tilted from each other by 90°. Due to such an arrangement, the second liquid crystal display panel LCD2 constitutes a so-called normally white (normally open) type display panel which performs a white display where an electric field is not applied to respective pixels so that backlight light transmits (passes through) the second liquid crystal display panel LCD2 and performs a black display where an electric field is applied to the respective pixels so that backlight light is blocked. In the same manner, a polarization axis of the first SP wave reflector BEM1 and a polarization axis of the second SP wave reflector BEM2 are also tilted from each other by 90°. Here, the first SP wave reflector BEM1 and the second SP wave reflector BEM2 are explained in detail later.

In the liquid crystal display device of the embodiment 1, the first liquid crystal display panel LCD1 is arranged closer to an image display side which is a side of a viewer not shown in the drawing than the first polarizer POL1 is. The liquid crystal display device of the embodiment 1 may adopt any type of liquid crystal display panel such as a TN-type liquid crystal display panel, a VA(Vertical Alignment)-type liquid crystal display panel or an IPS(In-Plane Switching)-type liquid crystal display panel. The third polarizer POL3 is arranged on a display screen side of the first liquid crystal display panel LCD1, that is, on a side of the viewer not shown in the drawing. Here, the direction of a polarization axis of the third polarizer POL3 with respect to the direction of a polarization axis of the first polarizer POL1 is suitably set corresponding to a type of the first liquid crystal display panel LCD1.

Figure 2:
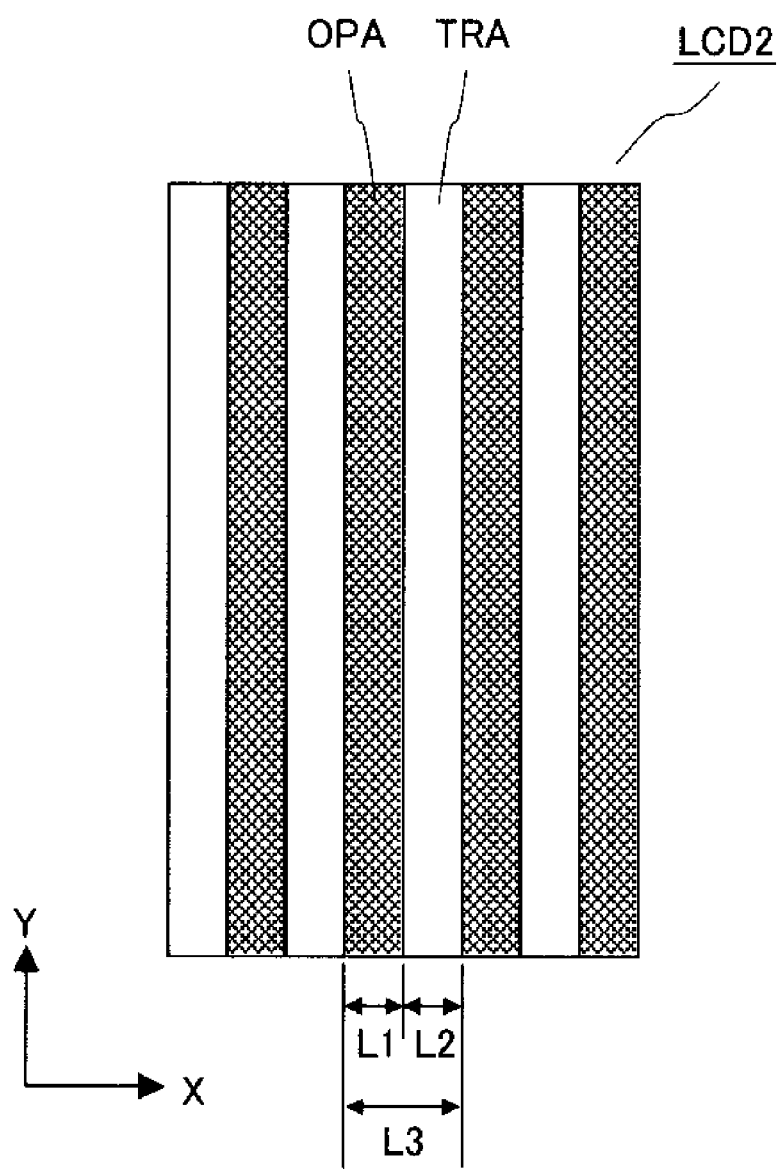
FIG. 2 is a view for explaining a parallax barrier on a second liquid crystal display panel of the liquid crystal display device according to the embodiment 1 when performing a 3D display.
Figure 3:
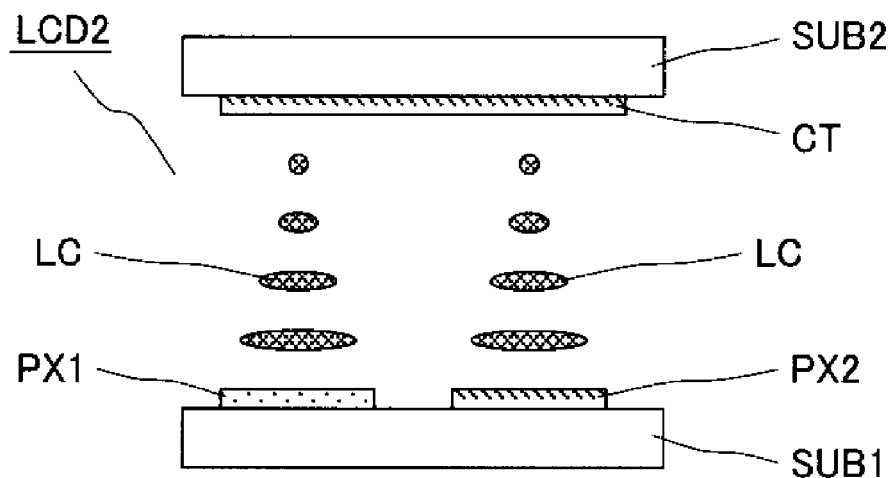
FIG. 3 is a view for explaining an alignment state of liquid crystal molecules in the liquid crystal display device according to the embodiment 1 when performing the 2D display.
Figure 4:
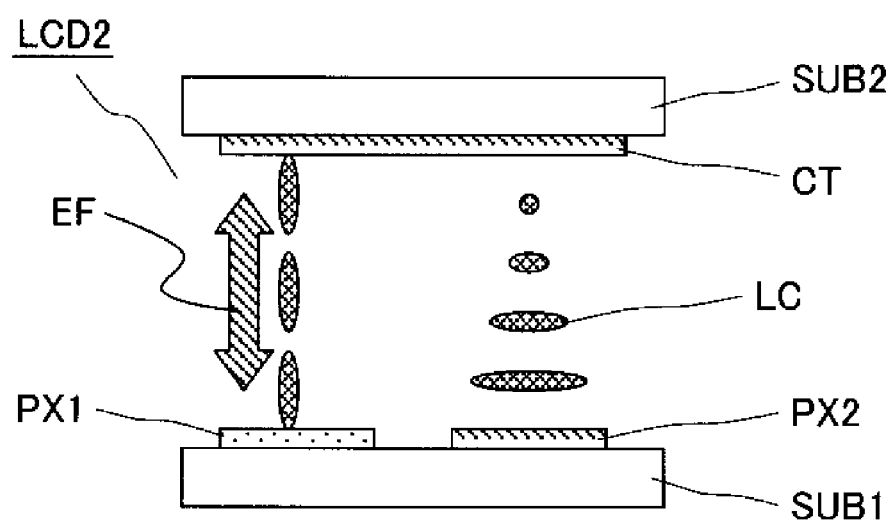
FIG. 4 is a view for explaining an alignment state of liquid crystal molecules in the liquid crystal display device according to the embodiment 1 when performing the 3D display.

FIG. 2 is a view for explaining the parallax barrier of the second liquid crystal display panel of the liquid crystal display device of the embodiment 1 when performing a 3D display, and FIG. 3 and FIG. 4 are views for explaining an alignment state of liquid crystal molecules of the liquid crystal display device of the embodiment 1 when performing a 2D display and the 3D display. Particularly, FIG. 3 is the view showing an alignment state of liquid crystal molecules when performing the 2D display, that is, an alignment state of the liquid crystal molecules when an electric field is not applied to respective pixels of the second liquid crystal display panel (when the 3D display is in an OFF state). On the other hand, FIG. 4 is a view showing an alignment state of liquid crystal molecules when performing the 3D display, that is, an alignment state of liquid crystal molecules when an electric field is applied to pixels which constitute a parallax barrier of the second liquid crystal display panel (when the 3D display is in an ON state). Further, symbols X, Y respectively indicate an X axis and a Y axis.

Hereinafter, the formation of the parallax barrier in the second liquid crystal display panel according to the embodiment 1 is explained in conjunction with FIG. 2 to FIG. 4.

As shown in FIG. 2, in the liquid crystal display device of the embodiment 1, when the 3D display is in an ON state, by displaying plural black stripes (indicated by hatching in the drawing) which extend in the Y direction and are arranged parallel to each other in the X direction on the second liquid crystal display panel LCD2 which performs a monochromic (black-and-white) display, a backlight light transmission region (an opening region of the barrier) TRA and a backlight light blocking region (a shielding region, a barrier forming region) OPA are alternately arranged parallel to each other in the X direction thus forming the parallax barrier. In the embodiment 1, the second liquid crystal display panel LCD2 is arranged closer to the backlight unit BLU than the first liquid crystal display panel LCD1 is and hence, backlight light corresponding to the light transmission regions TRA is irradiated to the first liquid crystal display panel LCD1 whereby it is possible to allow a viewer to observe different images with respect to his left and right viewpoints arranged in the X direction which is the parallel arrangement direction of the light blocking regions OPA.

In the second liquid crystal display panel LCD2 of the embodiment 1, a polarization direction of the polarizer POL1 arranged on a backlight unit BLU side and a polarization direction of the polarizer POL3 arranged on a first liquid crystal display panel LCD1 side are arranged orthogonal to each other. The second liquid crystal display panel LCD2 constitutes a normally white (normally open) type display panel where each pixel assumes alight transmission state (white display state) in a state where an electric field is not applied to the liquid crystal layer. As shown in FIG. 2, a sum of a width L1 of the light blocking region OPA and a width L2 of the light transmission region TRA arranged adjacent to the light blocking region OPA becomes a barrier pitch L3. Further, a light shielding ratio (%) of the barrier in the second liquid crystal display panel LCD2 is indicated by (100×L1)/L3, and a aperture ratio of the barrier is indicated by (100×L2)/L3. In the liquid crystal display device of the embodiment 1, a ratio between the width L1 of the light blocking region OPA and the width L2 of the light transmission region TRA is set to 1:1, that is, L1=L2 so that the aperture ratio of the barrier=the barrier shielding ratio=50%.

As described above, the second liquid crystal display panel LCD2 is formed of a TN-type liquid crystal display panel and hence, as shown in FIG. 3 and FIG. 4, a first substrate SUB1 on which pixel electrodes PX1, PX2 and the like are formed and a second substrate SUB2 on which a common electrode CT and the like are formed are arranged to face each other in an opposed manner with liquid crystal LC sandwiched therebetween. In the second liquid crystal display panel LCD2 having such a constitution, when the 3D display is in an OFF state, that is, when the 2D display is in an ON state, as shown in FIG. 3, a voltage which does not generate an electric field between all pixel electrodes PX1, PX2 and the common electrode CT is applied so that molecules of liquid crystal LC are continuously twisted by 90° from the first substrate SUB1 toward the second substrate SUB2. As a result, for example, backlight light which is incident on the second liquid crystal display panel LCD2 from the first substrate SUB1 side is irradiated from the second substrate SUB2 side after the polarization direction of the backlight light is rotated by 90° along the twist of liquid crystal LC, passes through the SP wave reflector BEM1 and the first polarizer POL1 not shown in the drawing, and is irradiated to the first liquid crystal display panel LCD1.

Further, when the 3D display is in an ON state, that is, when performing the 3D display, as shown in FIG. 4, a voltage corresponding to the black display is applied to the pixel electrodes PX1 of pixels which correspond to the light blocking region OPA, and an electric field EF is generated between the common electrode CT and the pixel electrodes PX1. Due to such an electric field EF, the alignment direction (long axis direction) of molecules of liquid crystal LC is arranged along the direction of an electric field generated between the first substrate SUB1 and the second substrate SUB2. As a result, backlight light which is incident on the second liquid crystal display panel LCD2 from the first substrate SUB1 side is irradiated from the second substrate SUB2 side in a state where the rotation of the polarization direction by liquid crystal LC is not made. As a result, as described in detail later, the backlight light irradiated from the second substrate SUB2 is reflected on the SP wave reflector BEM1 and, at the same time, remaining light which is not reflected on the SP wave reflector BEM1 is absorbed by the polarizer POL1. The backlight light which is reflected on the SP wave reflector BEM1 is returned to the second liquid crystal display panel LCD2. Here, to the pixel electrode PX2 in the light transmission region TRA which is a region shown on a right side in FIG. 4, in the same manner as a period during which the above-mentioned 2D display is performed, a voltage which is equal to a voltage applied to the common electrode CT is applied so that an electric field is not generated between the pixel electrode PX2 and the common electrode CT. Accordingly, the backlight light which is incident on the second liquid crystal display panel LCD2 from the first substrate SUB1 side is, after the polarization direction of the backlight light is rotated by 90° along the twist of liquid crystal LC, irradiated from the second substrate SUB2 side, passes through the SP wave reflector BEM1 and the polarizer POL1, and is irradiated to the first liquid crystal display panel LCD1.

Figure 5:
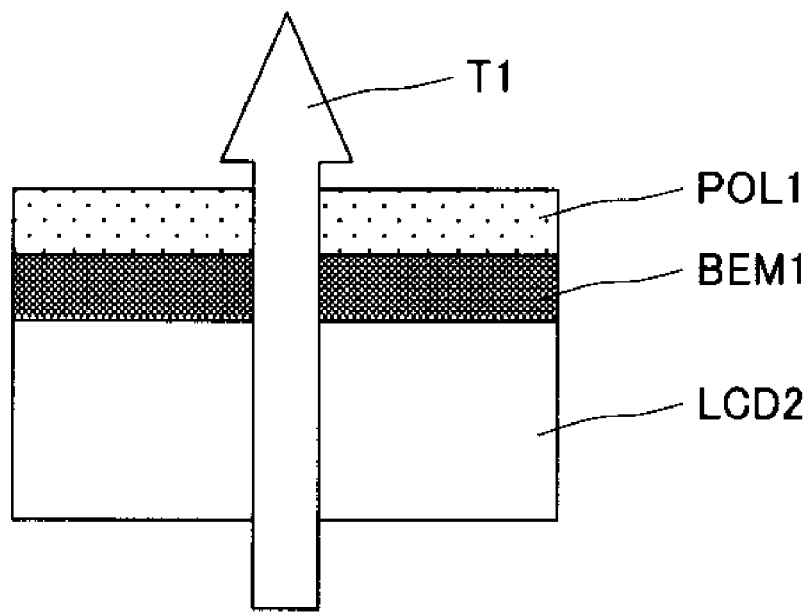
FIG. 5 is a view for explaining effects acquired by an SP wave reflector of the liquid crystal display device according to the embodiment 1 of the present invention.
Figure 6:
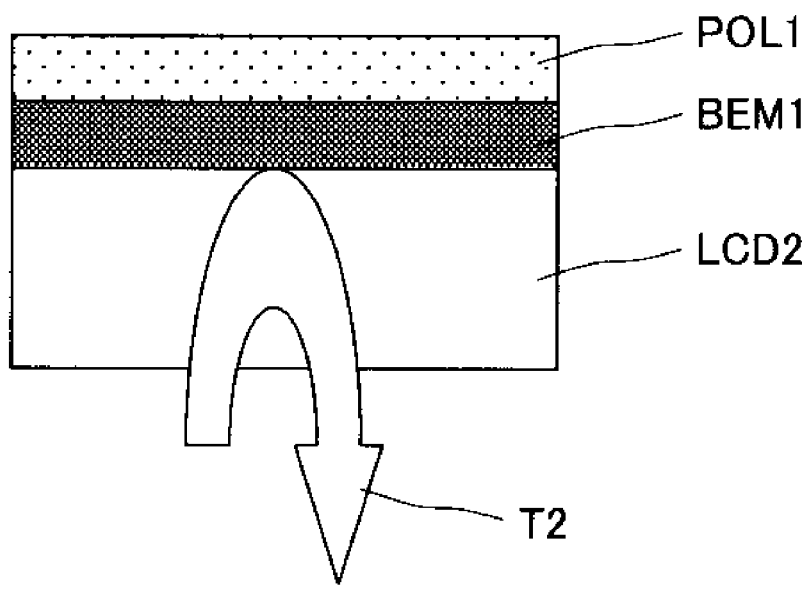
FIG. 6 is a view for explaining effects acquired by an SP wave reflector of the liquid crystal display device according to the embodiment 1 of the present invention.

Next, FIG. 5 and FIG. 6 are views for explaining effects acquired by the SP wave reflector of the liquid crystal display device according to the embodiment 1 of the present invention. Hereinafter, in conjunction with FIG. 1 to FIG. 6, the manner of operation for enhancing brightness by the SP wave reflector BEM1 of the liquid crystal display device according to the embodiment 1 is explained. In these drawings, particularly, FIG. 5 is the view showing a backlight light incident on the light transmission region TRA of the second liquid crystal display panel LCD2, and FIG. 6 is the view showing a backlight light incident on the light blocking region OPA of the second liquid crystal display panel LCD2.

(When Performing 3D Display)

In the liquid crystal display device according to the embodiment 1, with respect to a backlight light irradiated from the backlight unit BLU shown in FIG. 1, firstly, with the use of the second SP wave reflector BEM2, in the lights (backlight light) having two polarization components orthogonal to each other, the light, which has the polarization component having the same polarization direction, passes through the second SP wave reflector BEM2, and the light having the polarization component which does not have the same polarization direction is reflected on the second SP wave reflector BEM2 and is returned to the backlight unit BLU. With respect to the backlight light which passes through the second SP wave reflector BEM2, only the light having the preset polarization direction passes the second polarizer POL2 and the light having other polarization directions is absorbed by the second polarizer POL2. Although the SP wave reflectors BEM1, 2 have polarization characteristics, the polarization performances of the SP wave reflectors BEM1, 2 are low compared to the polarization performances of the polarizers POL 1 to 3 and hence, in the embodiment 1, the polarizers POL 1, 2 are arranged together with the SP wave reflectors BEM1, 2.

Here, the liquid crystal display device is in a 3D display state and hence, as shown in FIG. 5, a backlight light T1 which passes through the polarizer POL2 and is indicated by an arrow which is incident on the light transmission region TRA has the polarization direction thereof rotated by 90° by being modulated by the second liquid crystal display panel LCD2 as described previously. Here, polarization directions of the first SP wave reflector BEM1 and the first polarizer POL1 are arranged orthogonal to, that is, are rotated by 90° with respect to the polarization directions of the second SP wave reflector BEM2 and the second polarizer POL2. Accordingly, the backlight light T1 which is irradiated after the polarization direction is rotated by 90° by the second liquid crystal display panel LCD2 passes through the first SP wave reflector BEM1 and the first polarizer POL1. The backlight light T1 which has passed the first SP wave reflector BEM1 and the first polarizer POL1 is irradiated to the first liquid crystal display panel LCD1, is subjected to gradation modulation corresponding to the 3D display by the first liquid crystal display panel LCD1 and, thereafter, the backlight light T1 is outputted to left and right eyes of a viewer from the third polarizer POL3 as display images at viewpoint positions different from each other thus providing a 3D display.

On the other hand, as shown in FIG. 6, a backlight light T2 which passes through the polarizer POL2 and is indicated by an arrow which is incident on the light blocking region OPA has the polarization direction thereof not changed by the second liquid crystal display panel LCD2 as described previously. Accordingly, the backlight light T2 which is irradiated from the second liquid crystal display panel LCD2 becomes the light having polarization direction orthogonal to the polarization axis direction of the first SP wave reflector BEM1 and hence, the light is reflected on the first SP wave reflector BEM1. The backlight light T2 which is reflected by the first SP wave reflector BEM1 passes through the second liquid crystal display panel LCD2 with the polarization direction thereof not changed by the second liquid crystal display panel LCD2 and, thereafter, the backlight light T2 passes through the second polarizer POL2 and the second SP wave reflector BEM2 and is incident on the backlight unit BLU. The light incident on the backlight unit BLU is subjected to the reflection and a change in the polarization direction by the reflector and the like in the backlight unit BLU again, and the light is irradiated from the backlight unit BLU as the backlight light together with an irradiated light from a light source not shown in the drawing.

Figure 13:
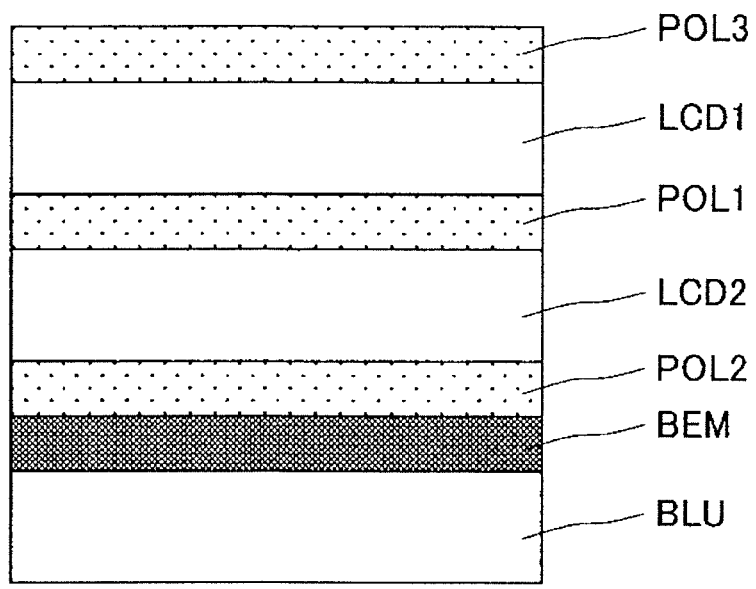
FIG. 13 is a view for explaining the schematic constitution of the conventional liquid crystal display device.

In this manner, according to the liquid crystal display device of this embodiment 1, by arranging the second liquid crystal display panel LCD2 closer to a backlight unit BLU side than the first liquid crystal display panel LCD1 is and by arranging the first SP wave reflector BEM1 and the first polarizer POL1 between the first liquid crystal display panel LCD1 and the second liquid crystal display panel LCD2, only the backlight light irradiated to the light blocking region OPA for forming the barrier region is efficiently returned to the backlight unit BLU side, and the returned light can be reused as the backlight light again. Accordingly, display brightness when performing the 3D display is efficiently enhanced without lowering brightness when performing the 2D display. According to the measurement carried out by inventors of the present invention, the result obtained is that the liquid crystal display device of the embodiment 1 can enhance brightness when performing the 3D display by 5% compared to the conventional liquid crystal display device shown in FIG. 13, for example. That is, due to such enhancement of brightness, the power consumption of the backlight unit BLU can be reduced by 5% to acquire the same brightness, for example.

(When Performing 2D Display)

Also when performing the 2D display, with respect to a backlight light irradiated from the backlight unit BLU, with the use of the second SP wave reflector BEM2, the light having the polarization component which has the same polarization direction passes through the second SP wave reflector BEM2, while the light having the polarization component which does not have the same polarization direction is reflected on the second SP wave reflector BEM2 and is reflected on the backlight unit BLU. Only the light having polarization direction of the backlight light which passes through the second SP wave reflector BEM2 passes through the second polarizer POL2.

When performing the 2D display, the backlight light is irradiated from the second liquid crystal display panel LCD2 after all pixels assume a backlight light transmission state (white state), that is, after the polarization direction of the backlight light incident on the second liquid crystal display panel LCD2 is rotated by 90° in all pixels. As a result, the backlight light from all pixels passes through the first SP wave reflector BEM1 and the first polarizer POL1, and is irradiated to the first liquid crystal display panel LCD1. The backlight light is, after being subject to gradation modulation corresponding to the 2D display by the first liquid crystal display panel LCD1, outputted to left and right eyes of a viewer as a display image at the same viewpoint position thus providing a 2D display. When performing the 2D display, all pixels in the second liquid crystal display panel LCD2 assume a state shown in FIG. 5 and hence, the backlight light is not reflected on the first SP wave reflector BEM1.

As the SP wave reflectors BEM1, BEM2 which allow the transmission of the light having the polarization component which has the same polarization direction and reflects the light having polarization component which does not have the same polarization direction, for example, NIPOCS PCF series made by NITTO DENKO CORPORATION, a brightness enhancing film made by Sumitomo 3M Limited or the like can be used. However, the SP wave reflectors BEM1, BEM2 according to the present invention are not limited to these products.

In this manner, the liquid crystal display device according to the embodiment 1 includes the first liquid crystal display panel LCD1 which performs an image display, the second liquid crystal display panel LCD2 which is arranged on the back surface side of the first liquid crystal display panel LCD1 and performs a display of a parallax barrier pattern constituted of the light transmission regions TRA and the light blocking regions OPA, and the backlight unit BLU which is arranged on the back surface side of the second liquid crystal display panel LCD2 and irradiates a backlight light, and the backlight light is irradiated to the first liquid crystal display panel LCD1 via the second liquid crystal display panel LCD2. Here, the second liquid crystal display panel LCD2 which forms the parallax barrier and performs a monochromic display is arranged closer to the backlight unit BLU side than the first liquid crystal display panel LCD1 is, and the SP wave reflector BEM1 is arranged between the first liquid crystal display panel LCD1 and the second liquid crystal display panel LCD2 on a side closer to the second liquid crystal display panel LCD2 than the polarizer POL1 is. Accordingly, when performing the 3D display, the backlight light irradiated from the second liquid crystal display panel LCD2 and in the light blocking region OPA which constitutes the parallax barrier is reflected on the SP wave reflector BEM1 so that the backlight light can be irradiated to the second liquid crystal display panel LCD2 from the backlight unit BLU again whereby display brightness when performing the 3D display can be enhanced without lowering display brightness when performing the 2D display.

As a result, the liquid crystal display device according to the embodiment 1 can also particularly enhance the power efficiency of the backlight unit BLU.

In the liquid crystal display device according to the embodiment 1, by setting the extension direction and the parallel arrangement direction of the black stripes of the parallax barrier displayed on the second liquid crystal display panel LCD2 such that the black stripes of the parallax barrier extend in the X direction and are arranged parallel to each other in the Y direction, and by rotating an image displayed by the first liquid crystal display panel LCD1 by 90°, in the same liquid crystal display device, it is possible to perform the 2D display and the 3D display both in the longitudinal direction and in the lateral direction.

Further, the liquid crystal display device according to the embodiment 1 has been explained with respect to a case where a TN type liquid crystal display panel is used as the second liquid crystal display panel LCD2. However, the second liquid crystal display panel LCD2 is not limited to the TN type liquid crystal display panel, and may be formed of a liquid crystal display panel of another type in the same manner as the first liquid crystal display panel LCD1. Also in this case, the polarization direction of the SP wave reflector BEM1 and the polarization direction of the polarizer POL1 are equal, while the polarization direction of the SP wave reflector BEM2 and the polarization direction of the polarizer POL2 are also equal. However, the polarization direction of the pair of the SP wave reflector BEM1 and the polarizer POL1 and the polarization direction of the pair of the SP wave reflector BEM2 and the polarizer POL2 are displaced from each other by 90°.

Embodiment 2

Figure 7:
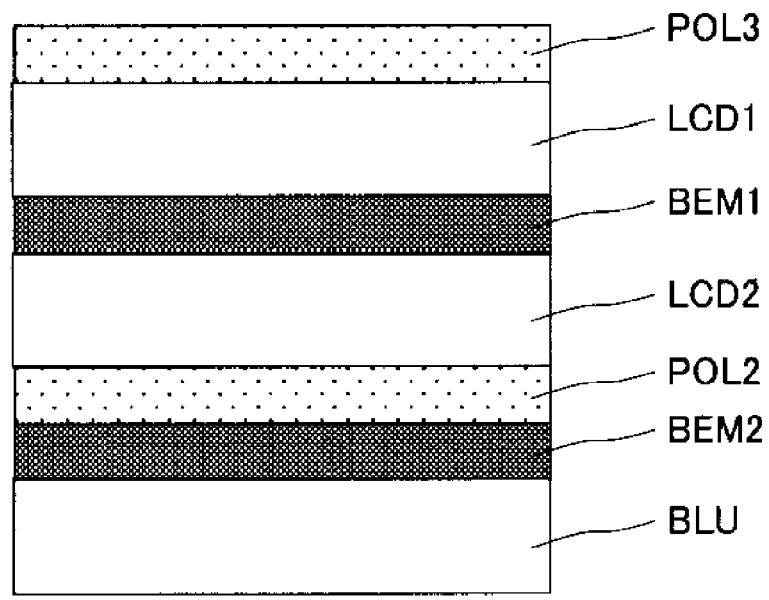
FIG. 7 is a view for explaining the schematic constitution of a liquid crystal display device according to an embodiment 2 of the present invention.

FIG. 7 is a view for explaining the schematic constitution of a liquid crystal display device according to the embodiment 2 of the present invention, wherein except for the constitution where only a first SP wave reflector BEM1 is arranged between a first liquid crystal display panel LCD1 and a second liquid crystal display panel LCD2, the liquid crystal display device according to the embodiment 2 has the substantially same constitution as the liquid crystal display device according to the embodiment 1. Accordingly, in the explanation made hereinafter, the constitution where the first SP wave reflector BEM1 is arranged between the first liquid crystal display panel LCD1 and the second liquid crystal display panel LCD2 is explained in detail.

As shown in FIG. 7, in the liquid crystal display device of the embodiment 2, in the order starting from a backlight unit BLU, a second SP wave reflector BEM2, a second polarizer POL2, the second liquid crystal display panel LCD2, the first SP wave reflector BEM1, the first liquid crystal display panel LCD1, and a third polarizer POL3 are arranged in an overlapping manner. Also in this case, the polarization axis direction of the second polarizer POL2 and the polarization axis direction of the second SP wave reflector BEM2 are set equal, and the polarization axis direction of the first SP wave reflector BEM1 and the polarization axis direction of the second SP wave reflector BEM2 are arranged to be orthogonal to each other.

Accordingly, a backlight light irradiated from the backlight unit BLU passes through the second SP wave reflector BEM2 and the second polarizer POL2 in the same manner as the above-mentioned liquid crystal display device according to the embodiment 1 and, thereafter, is incident on the second liquid crystal display panel LCD2.

Here, when performing a 3D display, in the same manner as FIG. 3 and FIG. 4 which shows the above-mentioned embodiment 1, a backlight light corresponding to a light transmission region TRA of the second liquid crystal display panel LCD2 and a backlight light corresponding to the light blocking region OPA are subjected to different modulations. Accordingly, the backlight light which passes through pixels corresponding to the light transmission region TRA is modulated by the second liquid crystal display panel LCD2 and is turned into a backlight light whose polarization direction is rotated by 90° and hence, the backlight light passes through the first SP wave reflector BEM1 and is irradiated to the first liquid crystal display panel LCD1. Thereafter, gradation modulation corresponding to the 3D display is applied to the backlight light by the first liquid crystal display panel LCD1 and, thereafter, is outputted from the third polarizer POL3 to left and right eyes of a viewer as display images at different viewpoint positions thus providing a 3D display.

On the other hand, with respect to the backlight light which passes through the pixels corresponding to the light blocking region OPA, the polarization direction of the backlight light is not modulated by the second liquid crystal display panel LCD2. That is, the backlight light is irradiated as a backlight light having the polarization direction orthogonal to the polarization axis direction of the first SP wave reflector BEM1 and hence, the backlight light is reflected on the first SP wave reflector BEM1. Here, although the backlight light which remains without being reflected by the first SP wave reflector BEM1 is irradiated to the first liquid crystal display panel LCD1, an amount of the remaining backlight light is extremely small and hence, a light blocking effect is not deteriorated.

The backlight light which is reflected by the first SP wave reflector BEM1, in the same manner as the above-mentioned embodiment 1, passes through the second liquid crystal display panel LCD2 with the polarization direction thereof not changed by the second liquid crystal display panel LCD2 and, thereafter, the backlight light passes through the second polarizer POL2 and the second SP wave reflector BEM2 and is incident on the backlight unit BLU. The light incident on the backlight unit BLU is subjected to the reflection and a change in the polarization direction by the reflector and the like in the backlight unit BLU again, and the light is irradiated from the backlight unit BLU as the backlight light together with an illumination light from a light source not shown in the drawing.

When performing a 2D display, in the same manner as the first embodiment, all pixels in the second liquid crystal display panel LCD2 assume a backlight light transmission state and hence, the backlight light from all pixels passes through the first SP wave reflector BEM1 and is irradiated to the first liquid crystal display panel LCD1. The backlight light is, after being subject to gradation modulation corresponding to the 2D display by the first liquid crystal display panel LCD1, outputted to left and right eyes of a viewer as a display image at the same viewpoint position thus providing a 2D display whereby lowering of brightness or the like does not occur.

In this manner, in the liquid crystal display device according to the embodiment 2, the second liquid crystal display panel LCD2 is arranged on a more backlight unit BLU side than the first liquid crystal display panel LCD1 and only the first SP wave reflector BEM1 is arranged between the first liquid crystal display panel LCD1 and the second liquid crystal display panel LCD2 and hence, lowering of brightness when performing the 2D display can be prevented whereby display brightness when performing the 3D display can be further efficiently enhanced. According to the measurement carried out by inventors of the present invention, the result obtained is that the liquid crystal display device of the embodiment 2 can enhance brightness when performing the 3D display by 32% compared to the conventional liquid crystal display device shown in FIG. 13, for example. Further, due to such enhancement of brightness, the power efficiency (power efficiency of the backlight unit BLU) can be enhanced by 32%.

Further, in the liquid crystal display device of the embodiment 2, display brightness when performing the 3D display can be largely enhanced and hence, this embodiment 2 can acquire a particular advantageous effect that lowering of brightness when a display mode is switched from the 2D display to the 3D display can be made small. As a result, this embodiment 2 can also acquire an advantageous effect that a discomfort that a viewer feels when a display mode is switched from the 2D display to the 3D display can be largely reduced.

Embodiment 3

A liquid crystal display device according to the embodiment 3 of the present invention is a liquid crystal display device where a robe (viewing region) when performing the 3D display in the liquid crystal display device according to the embodiment 2 is enlarged.

Figure 8:
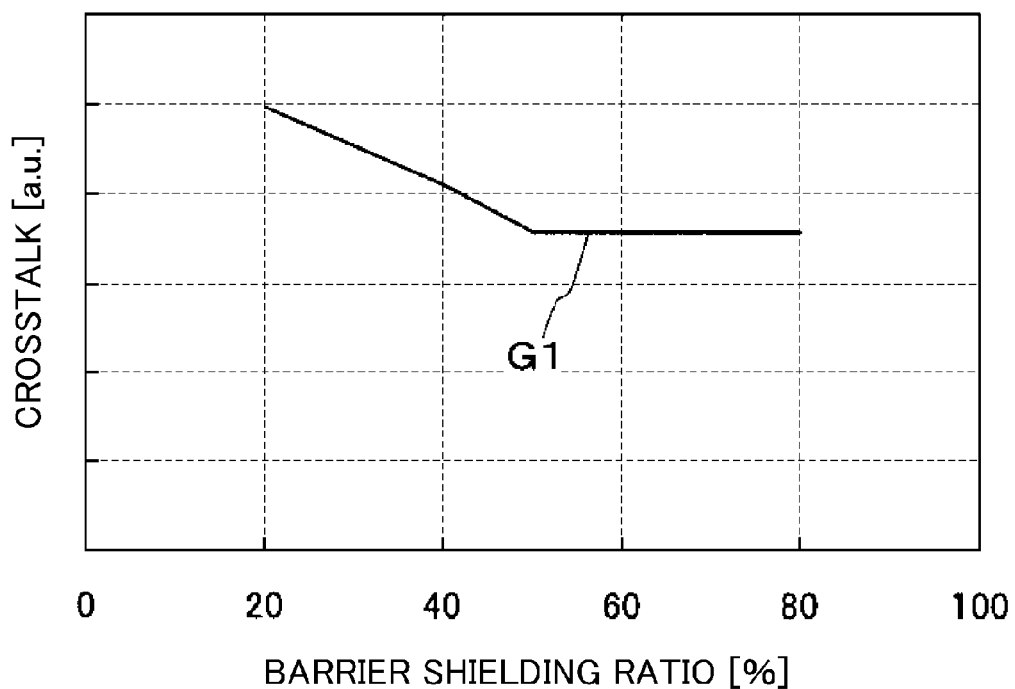
FIG. 8 is a view showing the relationship between a crosstalk and a barrier shielding ratio in the liquid crystal display device according to the embodiment 2 of the present invention.
Figure 9:
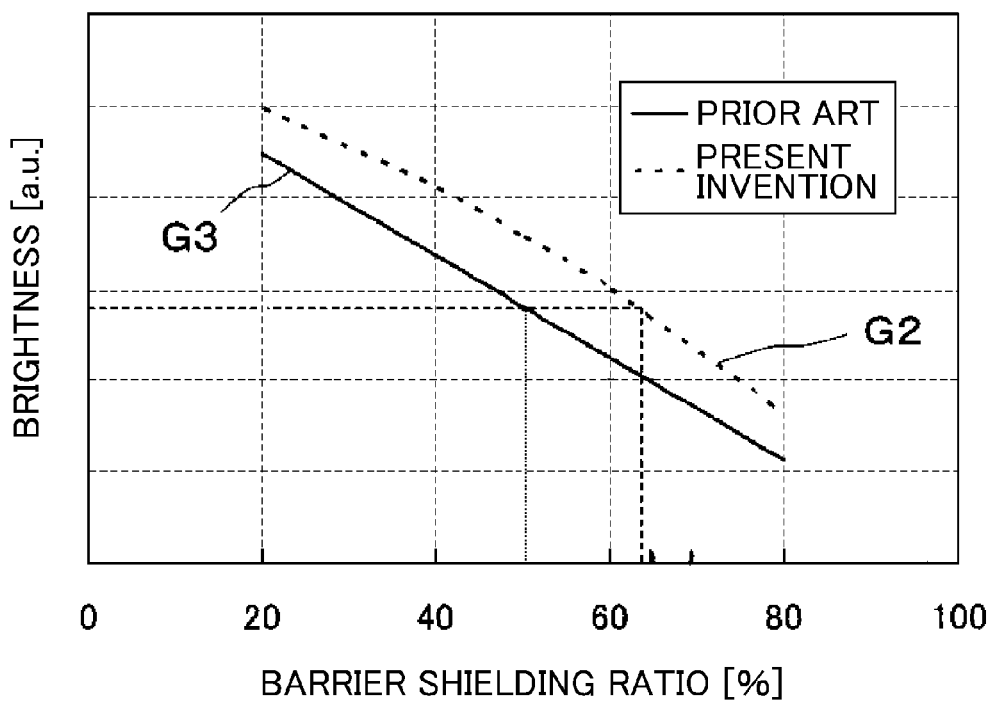
FIG. 9 is a view showing the relationship between brightness and the barrier shielding ratio in the liquid crystal display device according to the embodiment 2 of the present invention.
Figure 10:
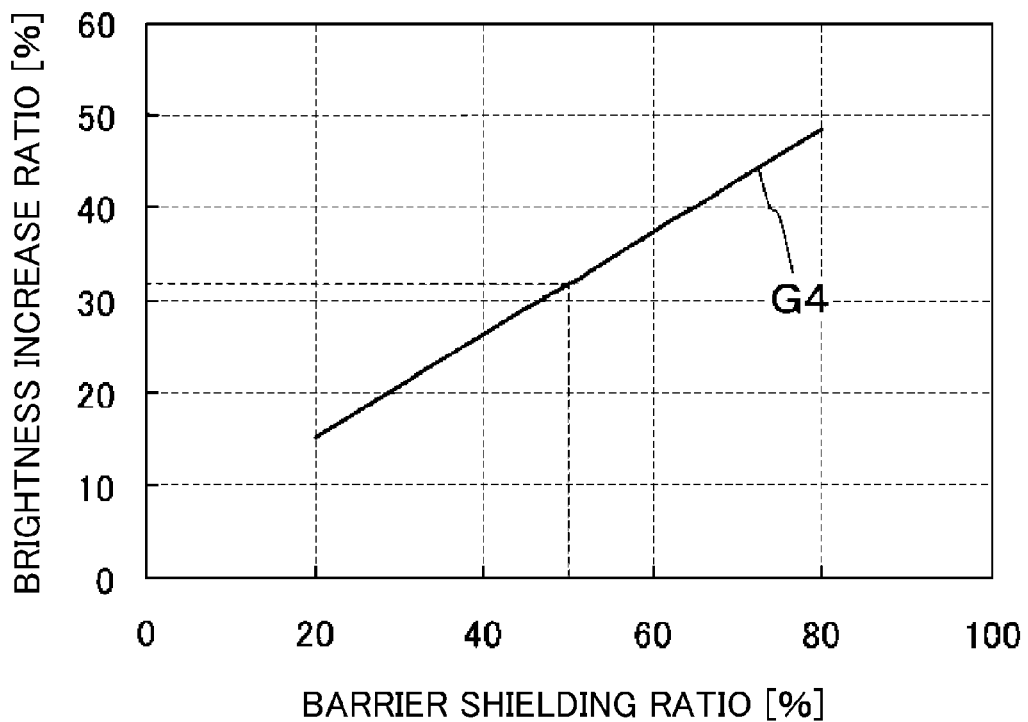
FIG. 10 is a view showing the relationship between a brightness increase ratio and the barrier shielding ratio in the liquid crystal display device according to the embodiment 2 of the present invention.
Figure 11:
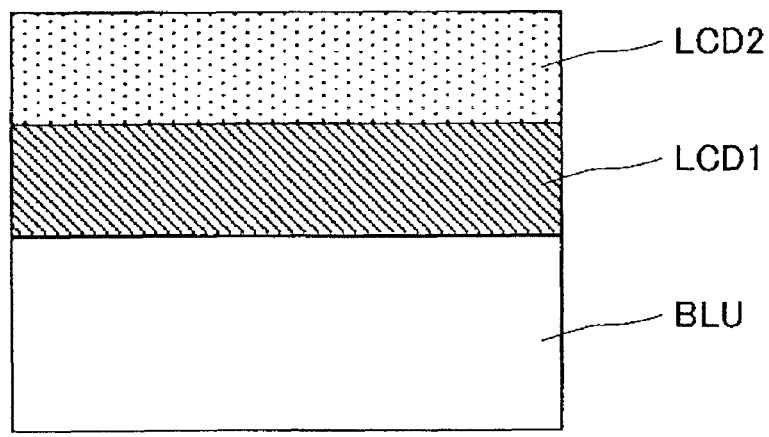
FIG. 11 is view for explaining the schematic constitution of a conventional liquid crystal display device.
Figure 12:
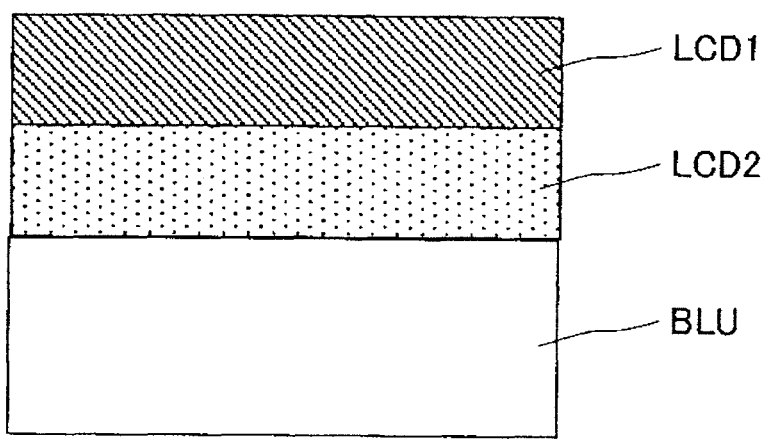
FIG. 12 is a view for explaining the schematic constitution of the conventional liquid crystal display device.

FIG. 8 is a view showing the relationship between crosstalk and a barrier shielding ratio in the liquid crystal display device according to the embodiment 2 of the present invention, FIG. 9 is a view showing the relationship between brightness and a barrier shielding ratio in the liquid crystal display device according to the embodiment 2 of the present invention, and FIG. 10 is a view showing the relationship between a brightness increase ratio and a barrier shielding ratio in the liquid crystal display device according to the embodiment 2 of the present invention.

As can be clearly understood from a graph G1 indicative of the relationship between a crosstalk generation amount and a barrier shielding ratio shown in FIG. 8, in the liquid crystal display device according to the embodiment 2, in a region where the barrier shielding ratio is 50% or less, a crosstalk generation amount is decreased along with the elevation of the barrier shielding ratio. However, in a region where the barrier shielding ratio is 50% or more, the crosstalk generation amount becomes almost fixed and hence, it is understood that the elevation of the barrier shielding ratio does not bring about the reduction of the crosstalk.

On the other hand, from graphs G2, G3 indicative of the relationship between brightness and a barrier shielding ratio shown in FIG. 9, it is understood that display brightness is lowered along with the increase of the barrier shielding ratio. Here, to compare the graph G3 indicative of the relationship between brightness and the barrier shielding ratio in the conventional liquid crystal display device with the graph G2 indicative of the relationship between brightness and the barrier shielding ratio in the liquid crystal display device according to the embodiment 3, with respect to the lowering of brightness when the barrier shielding ratio is increased, the lowering of brightness in the conventional liquid crystal display device appears equal to the lowering of brightness in the liquid crystal display device according to the embodiment 3. However, the liquid crystal display device according to the embodiment 3 can more effectively decrease a brightness lowering rate along with the increase of a barrier shielding ratio compared to a conventional liquid crystal display device.

In this case, as can be understood from a graph G4 indicative of the relationship between a brightness increase ratio and a barrier shielding ratio shown in FIG. 10 where a brightness increase ratio is expressed by a following formula, it is understood that the brightness increase ratio becomes 32% when the barrier shielding ratio is 50%, and the brightness increase ratio is further increased along with the increase of the brightness shielding ratio. That is, it is understood that the brightness in a transmission region when performing the 3D display is increased along with the increase of the barrier shielding ratio more in the liquid crystal display device to which the present invention is applied compared to the conventional liquid crystal display device.

Brightness increase ratio=100×(brightness of liquid crystal display device of embodiment 2)/(brightness of conventional liquid crystal display device)

Further, to enlarge a region where the 3D display is viewable (a region of a robe where the 3D display is observed continuously), it is effective to increase the barrier shielding ratio. Particularly, the region can be enlarged by setting the barrier shielding ratio to 50% or more.

Accordingly, for example, when display brightness when performing the 3D display is set substantially equal to display brightness of the conventional 3D display, as can be understood from FIG. 9, the barrier shielding ratio can be set to approximately 64% and hence, the robe can be largely expanded. Here, as can be understood from FIG. 8, the increase of crosstalk can be also suppressed and hence, lowering of image quality when performing 3D display can be also prevented.

Further, as can be understood from the graph G4 indicative of the relationship between a brightness increase ratio and a barrier shielding ratio shown in FIG. 10, even when a light source of the same amount of light is used, brightness of a backlight light which passes through a transmission region can be increased more than a conventional liquid crystal display device corresponding to the increase of the barrier shielding ratio and hence, the present invention can acquire an advantageous effect that the increase of the brightness difference when performing the 2D display and when performing the 3D display caused by the increase of a barrier shielding ratio can be suppressed.

While there have been described what are at present considered to be certain embodiments of the invention, it will be understood that various modifications may be made thereto, and it is intended that the appended claim cover all such modifications as fall within the true spirit and scope of the invention.

What is claimed is:

1. A liquid crystal display device comprising:
a first liquid crystal display panel which performs an image display;
a second liquid crystal display panel which is arranged on a back surface side of the first liquid crystal display panel and performs a display of a parallax barrier pattern constituted of light transmission regions and light blocking regions;
a backlight unit which is arranged on a back surface side of the second liquid crystal display panel and irradiates a backlight light to the first liquid crystal display panel via the second liquid crystal display panel;
a first polarization reflector which is arranged between the first liquid crystal display panel and the second liquid crystal display panel, and allows transmission of light having a polarization component, which has one polarization direction, of lights having two polarization components orthogonal to each other and reflects the light having a polarization component orthogonal to the one polarization direction; and
a polarizer arranged only on an image display screen side of the first liquid crystal display panel and a polarizer arranged between the backlight unit and the second liquid crystal display panel, wherein
the first polarization reflector reflects the backlight light, which passes through the second liquid crystal display panel, corresponding to the light blocking regions of the second liquid crystal display panel, and
a polarization direction of the first polarization reflector and a polarization direction of the polarizer arranged between the backlight unit and the second liquid crystal display panel are arranged orthogonal to each other.

2. The liquid crystal display device according to claim 1, wherein the liquid crystal display device further comprises: a second polarization reflector which allows the transmission of light, which has a polarization component having a same polarization direction, of lights having two polarization components orthogonal to each other and reflects the light having a polarization component which does not have the same polarization direction, and the second polarization reflector is arranged between the second liquid crystal display panel and the backlight unit, and a polarization direction of the first polarization reflector and a polarization direction of the second polarization reflector are arranged orthogonal to each other.

3. The liquid crystal display device according to claim 1, wherein the second liquid crystal display panel is formed of a normally-white twisted nematic liquid crystal display panel.

4. The liquid crystal display device according to claim 1, wherein the liquid crystal display device enables 2D and 3D display.

* * * * *